United States Patent

[11] 3,596,165

| [72] | Inventor | Roland E. Andrews |
| | | Portland, Oreg. |
| [21] | Appl. No. | 844,371 |
| [22] | Filed | July 24, 1969 |
| [45] | Patented | July 27, 1971 |
| [73] | Assignee | Tektronix Inc. |
| | | Beaverton, Oreg. |

[54] CONVERTER CIRCUIT HAVING A CONTROLLED OUTPUT
14 Claims, 7 Drawing Figs.

| [52] | U.S. Cl. | 321/2, 321/18 |
| [51] | Int. Cl. | H02m 3/28 |
| [50] | Field of Search | 321/18, 2, 43—45; 331/117 |

[56] References Cited
UNITED STATES PATENTS

| 3,026,486 | 3/1962 | Pintell | 331/117 X |
| 3,248,637 | 4/1966 | Albert et al | 321/18 |
| 3,303,408 | 2/1967 | Prines | 321/18 X |
| 3,305,794 | 2/1967 | Seelig | (321)/(45) |
| 3,316,476 | 4/1967 | Olson et al | 321/45 |
| 3,454,863 | 7/1969 | Hintz et al. | 321/44 |

Primary Examiner—William M. Shoop, Jr.
Attorney—Buckhorn, Blore, Klarquist and Sparkman ABSTRACT: An LC resonant circuit is alternately connected from DC input terminals to a winding on an output transformer via a pair of alternately operating switching transistors which turn on in synchronism with the resonant frequency of the LC circuit. Switching is accomplished when current flow through each transistor is substantially zero. The transistors are kept off for a selected period of time during each cycle of the LC circuit waveform, dependent upon a DC output voltage derived via rectification means from another winding on the output transformer. The frequency of operation of the circuit is responsive to the DC output voltage level for regulating the same.

ROLAND E. ANREWS
INVENTOR

BY
BUCKHORN, BLORE, KLARQUIST & SPARKMAN
ATTORNEYS

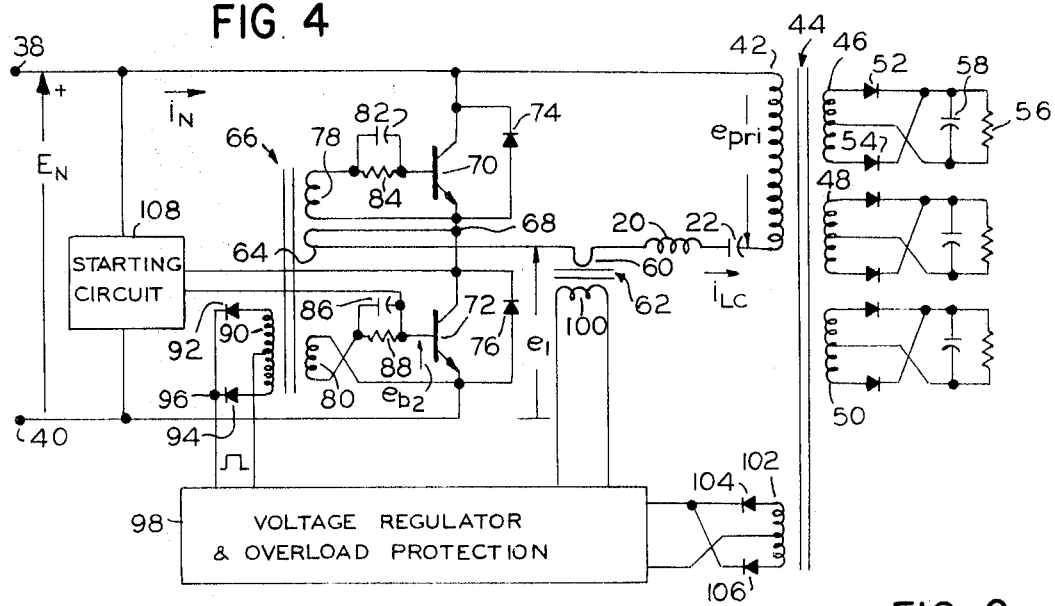
FIG. 4
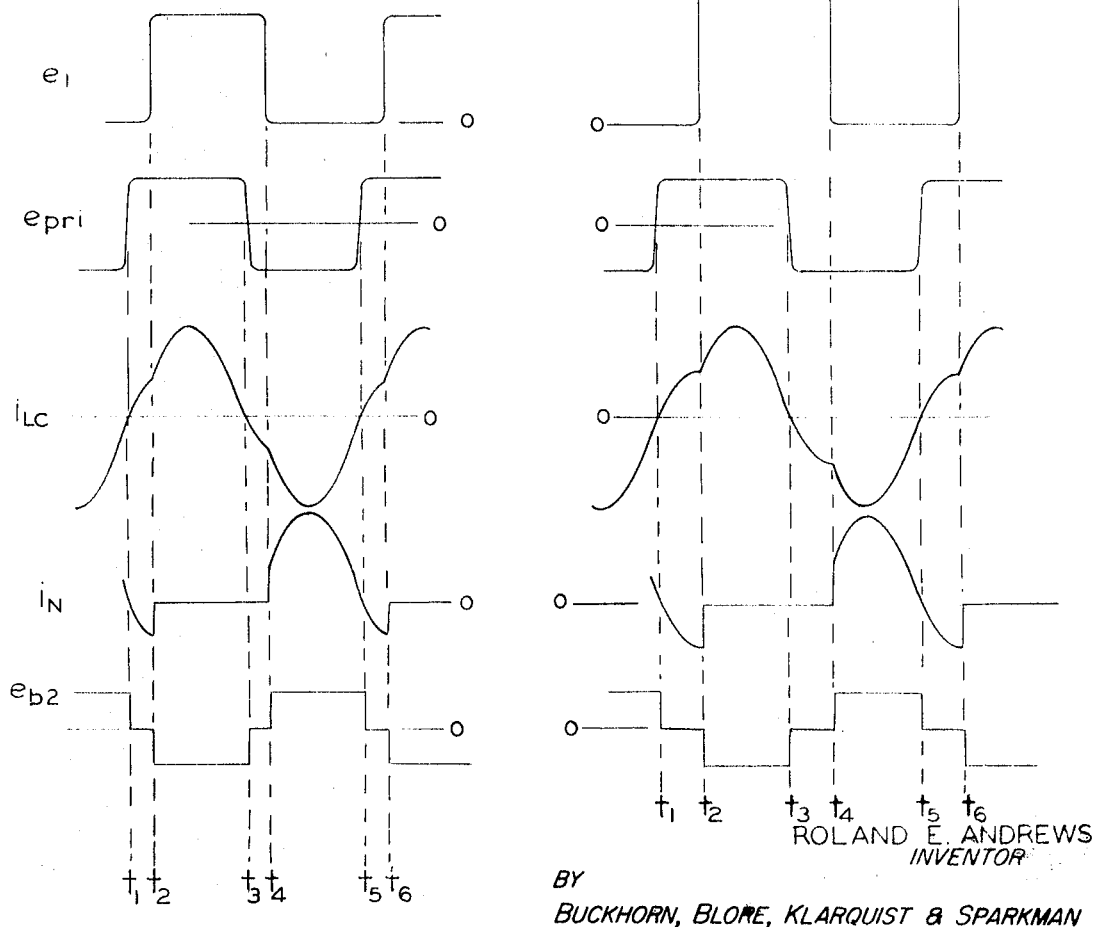
FIG. 5
FIG. 6

ROLAND E. ANDREWS
INVENTOR

BY
BUCKHORN, BLORE, KLARQUIST & SPARKMAN
ATTORNEYS

CONVERTER CIRCUIT HAVING A CONTROLLED OUTPUT

BACKGROUND OF THE INVENTION

Direct current to direct current conversion circuits involving an intermediate alternating current stage are suitably employed for a number of purposes. For example, it may be desired to increase a DC voltage level available for electronic equipment. In such case, an alternating current wave is generated and transformed to a higher voltage level, after which a rectification circuit produces a DC output at the higher level.

A double rectification process is also frequently useful wherein an alternating current power line voltage is rectified to produce a first DC level. The DC level value is then converted to AC again for appropriate voltage change and/or transformer isolation. The resulting alternating current wave is then rectified to produce a final DC output. Such a system can be advantageous because the AC conversion produced by the circuit is accomplished at a frequency considerably higher than the powerline frequency. Consequently, the transformer used for voltage step-up and/or isolation cam be smaller than a conventional power transformer.

It is desirable that the DC to DC converter be controlled to produce a predetermined output voltage. Prior art DC to DC converters have frequently employed switching devices for this purpose together with energy storage devices for producing a DC output at a controlled voltage level. For example, a "duty factor" switching transistor is alternately turned on and off, and a transformer or inductance is adapted to receive the transistor current. The output voltage is controlled in response to the on time of the transistor. The advantage of employing a switching transistor which is either on or off lies in the fact that little or no power dissipation occurs in the switching transistor. However, quite high peak currents flow in such a circuit as as compared with the actual DC output current desired. Also, electromagnetic interference generation occurs with switching, and severe requirements are made on the speed of recovery of rectifiers employed. Moreover, appreciable filtering is necessary for achieving an appropriate DC output level.

Sine wave oscillators can be employed for the generator of an AC output which may then be rectified in order to supply a DC level. However, the losses or dissipation involved with the usual active device such as a transistor utilized in an oscillator circuit are usually greater than those encountered in the case of a duty factor type switching circuit. Moreover, the dissipation problem is aggravated in the usual oscillator if regulation is desired, because the oscillator must then be biased at levels suitable for providing a greater or lesser output in response to voltage changes and the like. In such case, the oscillator active device is operating in a mode wherein considerable dissipation is likely to occur. That is, maximum current flow conditions in the active device do not occur at the same time as zero voltage drop thereacross, resulting in higher dissipation than in the case of a switching device.

SUMMARY OF THE INVENTION

In accordance with the present invention, a converter circuit comprises a tuned resonant circuit adapted to produce an AC output waveform. Switching means connects the resonant circuit between alternate DC input terminals and an output means such as the primary of a transformer. The secondary of the transformer suitably supplies a rectification circuit for producing the ultimate DC output. Feedback is employed for synchronizing the operation of the switching means relative to the waveform of the resonant circuit such that switching takes place near the point where the current in the resonant circuit passes through zero. In accordance with the present invention, the switches are held in the zero or off condition, inhibiting feedback, for a period of time during each cycle responsive to the voltage level of the output. As a result, the frequency of the AC wave in the resonant circuit is changed somewhat in response to the output level, and the frequency change in turn causes the output level to return to a desired value.

This circuit has several advantages including a relatively small peak current as compared with the average current in the circuit. Currents are nearly sine wave in character, and the peak value is approximately only π/2 larger than the average current value. Whereas in prior switching circuits no energy was delivered to the load for a large proportion of time, in the present circuit current is delivered for a large percentage of the time, resulting in an easier filtering of an eventual DC output. Efficiency is also improved as a result of high average power being transferred for given peak currents in transistors, transformers, and rectifiers. The switched voltage waveforms are slower than in conventional circuits as a result of the LC circuit drive. This slower switching results in reduced electromagnetic interference generation and less severe rectifier recovery requirements. Furthermore, since the switching devices are switched under substantially zero current conditions, the turnoff-time switching losses for these devices, e.g. in the case of transistors, is substantially eliminated. Since regulation takes place at the time the switches are already turned off, an effective regulation function takes place at each half-cycle of the AC wave.

It is an object of the present invention to provide a more efficient, regulated output, DC to DC converter circuit.

It is another object of the present invention to provide an improved regulated converter circuit having peak currents which are lower in value than heretofore encountered with switching-type converter circuits.

It is another object of the present invention to provide an improved regulated converter circuit supplying a high transfered average power for given peak currents in transistors, transformers, rectifiers, and the like.

It is another object of the present invention to provide an improved switching converter circuit wherein the switched waveforms are slower than in conventional circuits in order to reduce electromagnetic interference problems and make rectifier recovery requirements less severe.

It is a further object of the present invention to provide an improved regulated converter circuit of the switching type wherein switching and regulation are accomplished under substantially zero voltage conditions.

It is a further object of the present invention to provide an improved regulated converter circuit operating in a switching mode to provide minimized power dissipation in switching elements.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 4 is a diagram, partially schematic and partially in block diagram form, of the circuit according to the present invention;

FIG. 5 is a first waveform chart illustrating operation of the FIG. 4 circuit;

FIG. 6 is a second waveform chart illustrating operation of the FIG. 4 circuit.

DETAILED DESCRIPTION

Figure 1:
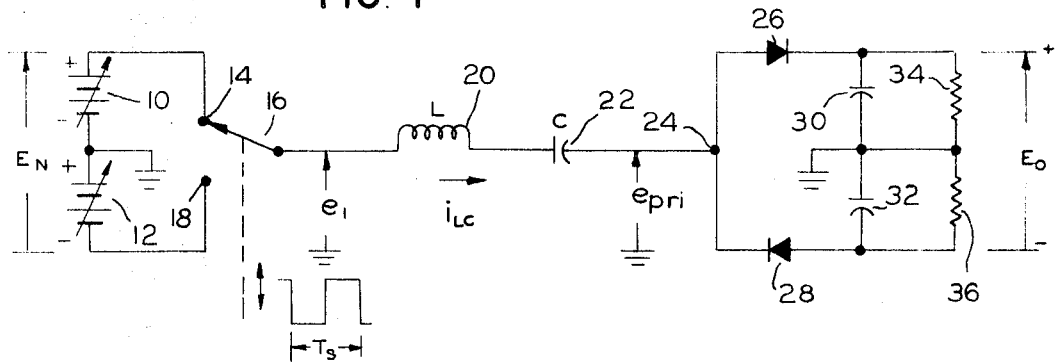
FIG. 1 is a schematic diagram of a circuit employed for explaining the operating principles of the present invention.

Referring to FIG. 1, illustrating a circuit which is helpful in explaining the operating theory of the present invention, a pair of batteries 10 and 12 are connected in series, and together provide an input voltage designated $E_N$. The midpoint between the two batteries is grounded. The positive terminal of battery 10 is connected to stationary contact 14 of single-pole double-throw switch 16 while the negative terminal of battery 12 is connected to the remaining stationary switch contact 18. A voltage $e_1$ is developed at the movable contact of switch 16 with respect to ground. The rectangular switching waveform of $e_1$ is also illustrated, this waveform having a period $T_r$. The movable contact of switch 16 is coupled through a coil 20 having an inductance L and a capacitor 22 having a capacitance C to a junction point 24 at which point a voltage designated $e_{pri}$ is developed. Terminal 24 is connected to the anode of a diode 26 and the cathode of diode 28 and the remaining terminals of these diodes are connected respectively to terminals of filter capacitors 30 and 32. The remaining terminals of the aforementioned capacitors are grounded. A first load resistor 34 is disposed across capacitor 30, with a second load resistor 36 being shunted across capacitor 32. An output voltage $E_0$ is developed across the two resistors in series.

Figure 2:
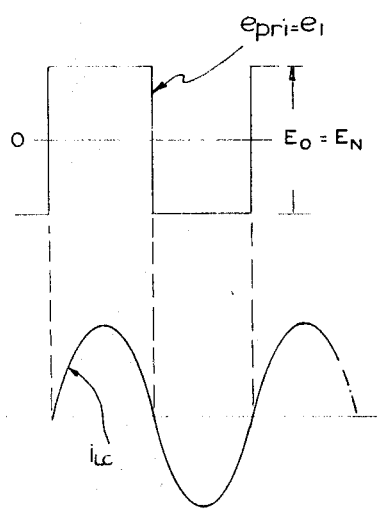
FIG. 2 is a first waveform chart illustrating operation of the FIG. 1 circuit.

The components employed are assumed to be substantially perfect for purposes of discussions, and switch 16 is operated at switch cycle frequency, $f_s$, equal to the resonant frequency, $f_{LC}$, of the series LC circuit comprising components 20 and 22. Moreover, switching is accomplished in phase synchronism with a sine wave current, $i_{LC}$, in components 20 and 22 as illustrated in FIG. 2.

As will be noted $e_{pri}$ is exactly equal to $e_1$, and the output voltage $E_0$ as rectified by diodes 26 and 28 and filtered by capacitors 30 and 32 is exactly equal to the input voltage $E_N$. $e_{pri}$ and $e_1$ each constitute a square wave as illustrated. The values of voltages $E_0$ and $E_N$ are both equal to the amplitude of the square wave, $e_1$.

Figure 3:
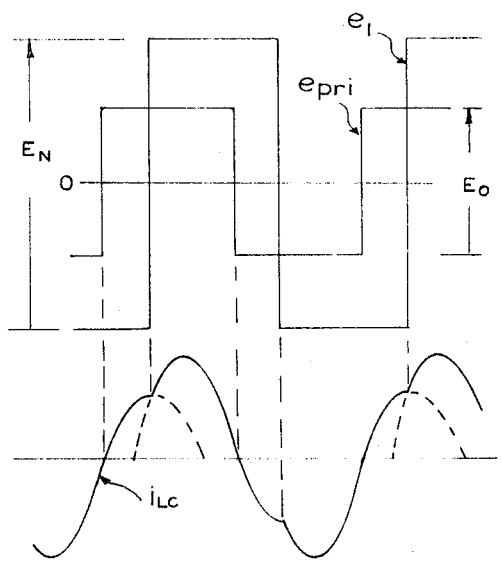
FIG. 3 is a second waveform chart illustrating the operation of the FIG. 1 circuit.

Now it is desired to control the value of the output voltage, and this control according to the present invention is accomplished by changing the rate of switching of switch 16 with respect to the AC current wave in components 20 and 22. The output voltage, $E_0$, can be regulated to a value less than $E_N$ by altering the switch frequency from the $f_{LC}$ value. Changing the switch frequency either above or below the LC frequency will accomplish a reduction in output voltage. However, for the remainder of the description, a reduced switch frequency will be considered. Let us assume that $E_N$ is now larger than desired, but the circuit is still to produce the same $E_0$ output value. The switching is now accomplished so that the switching rate now lags the frequency of the input waveforms, and as illustrated in FIG. 3, $e_{pri}$ is now smaller in amplitude and advanced in phase as compared with voltage waveform $e_1$. Consequently, the rectified output voltage $E_0$ is smaller in amplitude than the input voltage $E_N$.

As can be seen in FIG. 3, the waveform through the resonant circuit 20—22 is no longer precisely a sine wave, since the switching is accomplished out of synchronism with the resonant frequency of the LC circuit. Switching is accomplished in each case after the LC wave has passed the zero axis resulting the current waveform, $i_{LC}$, as illustrated in FIG. 3. The result is a lowering of the frequency of the circuit and the lowering of the output voltage with respect to the input voltage. The output voltage $E_0$ can be maintained constant for an input voltage equal to or greater than $E_0$ by the control of the frequency of switching. As the input voltage is raised, the result of regulation is that the peak input current remains approximately constant, but the delay in switching results in energy being returned to the source over part of the cycle. The average current drain diminishes as the input voltage is increased, maintaining a constant power drain from the source.

FIG. 4 illustrates a circuit embodiment of the present invention, partially in block diagram form. Referring to FIG. 4, a pair of DC input terminals 38 and 40 are provided with a voltage $E_N$ which is positive at terminal 38 with respect to 40. Terminal 38 is connected to one end of a primary winding 42 located upon transformer 44, this transformer also being provided with secondary windings 46, 48 and 50. A full wave rectification circuit comprising diodes 52 and 54 connects winding 46 to a load 56 having filter capacitor 58 disposed thereacross. Windings 48 and 50 are similarly provided with rectification circuits and loads.

The LC resonant circuit again comprises an inductor 20 and a capacitor 20 disposed in series with one end of the LC resonant circuit connected to the remaining end of primary winding 42. The terminal of the LC circuit opposite winding 42 is connected in series with a primary winding 60 on transformer 62, and a primary winding 64 on transformer 66 to a terminal 68. A pair of switching devices here comprising NPN transistors 70 and 72 are interposed between terminals 38 and 40, respectively, and the aforementioned terminal 68. Thus, the collector of transistor 70 is connected to terminal 38 while its emitter is connected to terminal 68. Transistor 70 is provided with a diode 74 shunted thereacross wherein the anode of the diode 74 is connected to the emitter of transistor 70. The collector of transistor 72 is connected to terminal 68 while its emitter is connected to terminal 40. Diode 76 is located across transistor 72, with the anode of diode 76 being connected to the emitter of transistor 72.

Transformer 66 comprises a feedback transformer and further includes secondary windings 78 and 80 provided for synchronizing purposes. One end of winding 78 is connected to the emitter of transistor 70, while the remaining terminal of winding 78 is connected to the base of transistor 70 via a biasing circuit comprising a parallel combination of capacitor 82 and resistor 84. Similarly, one end of winding 80 is connected to the emitter of transistor 72, while the remaining terminal thereof is coupled to the base of transistor 72 via a biasing circuit comprising the parallel combination of capacitor 86 and resistor 88. The connections of winding 80 are reversed with respect to those of winding 78 such that the bases of transistor 70 and 72 are driven out of phase for alternate conduction thereof.

An additional winding 90 on the transformer 66 is provided with a center tap, and the ends of the winding are coupled through diodes 92 and 94 to a common terminal 96. The cathodes of each of these diodes are connected to terminal 96. Terminal 96 together with the center tap of winding 90 are coupled to receive the output of voltage regulator and overcurrent protection circuit 98.

The voltage regulator and overcurrent protection circuit 98 receives a first input from winding 100 of transformer 62 and a second input from winding 102 of transformer 44. Winding 102 is coupled to voltage regulator and overcurrent protection circuit 98 by wall of a full wave rectifier comprising diodes 104 and 106.

The FIG. 4 circuit operates in the manner similar to that explained for the FIG. 1 circuit. Again, the input for the LC combination comes from the DC input $E_N$, and this DC input is switched. The sine wave current, $i_{LC}$, flowing through elements 20 and 22, flows through the primary 42 of transformer 44. If switching is accomplished in synchronism with the LC current wave, then the sine wave of current will remain undisturbed. However, if the switching is somewhat out of phase with the true sine wave, then the current through the LC circuit will depart slightly from a sine wave as illustrated in FIGS. 5 and 6.

Returning to FIG. 4, winding 64 in series with the LC circuit is a feedback winding and causes the transistors to tend to switch in synchronism with the LC wave since voltages synchronized with $i_{LC}$ are induced in winding 78 and 80. As a result, transistors 70 and 72 alternately conduct. When transistor 72 conducts, current flows from terminal 38 through winding 42, capacitor 22, coil 20, winding 60, winding 64, and the collector-emitter path of transistor 72 to terminal 40. On the other hand, when transistor 70 conducts, current flows through the collector-emitter path of transistor 70, winding 64, winding 60, coil 20, capacitor 22, and winding 42. It should be noted that the transistors 70 and 72 conduct for alternate half-cycles of the LC current wave in components 20 and 22, and switching between the transistors is accomplished substantially as the current wave in the LC resonant circuit passes through zero.

In accordance with the present invention, as the current wave passes through zero, both transistors are kept off for a selected period of time dependent upon the output voltage being produced. When the output voltage level, e.g. as provided output load resistor 56, is too high, the transistors 70 and 72 are kept off for a longer period of time whereby the voltage in transformer winding 42 will become comparatively less. However, if the output voltage level is too low, the transistors 70 and 72 are kept off a shorter period of time until the desired regulation is achieved. The regulation is accomplished via voltage regulator and overcurrent protection circuit 98. Winding 100 detects when the current wave in circuit 20—22 passes through zero, and in response thereto a substantially square wave of adjustable duration is provided at winding 90. This square wave clamps the voltage in the windings of transformer 66 by means of diodes 92 and 94 for the duration of the square wave such that feedback for turning on one of the transistors 70 or 72 is impeded or switched off. Then, the feedback is allowed to switch on at a point in each cycle of the resonant current wave for appropriate production of the desired output level. The output level is detected via winding 102 and applied to the voltage regulator and overcurrent protection circuit therefrom. Diodes 92 and 94 together with circuit 98 comprise feedback switching means. An example of an appropriate voltage regulator and overcurrent protection circuit is described in a subsequent embodiment.

FIGS. 5 and 6 further illustrate operation of the FIG. 4 circuit, with FIGS. 5 and 6 illustrating successively larger input voltages $E_N$. $e_1$ in each case is a voltage across transistor 72, while $e_{pri}$ is the voltage across primary winding 42. It will be noted that the current $i_N$ flows from the DC source only when the voltage $e_1$ across transistor 72 is substantially zero, that is, when either transistor 72 or diode 76 is conducting. When the voltage $e_1$ is maximum the current $i_{LC}$ flows through either transistor 70 or diode 74.

Considering the sequence illustrated in FIG. 5 in greater detail, as the resonant current in the tuned circuit, $i_{LC}$, passes through zero in a positive-going direction, at time $t_1$, the voltage, $e_{pri}$, increases to substantially maximum value. This is principally a consequence of the type of load employed in the present circuit wherein diodes 52 and 54, for example, charge up capacitor 58. For an entirely resistive AC load, the voltage, $e_{pri}$, would be less of a square wave and more like $i_{LC}$. At time $t_1$, the voltage $e_{b2}$, or the voltage at the base of transistor 72 with respect to terminal 40, is negative-going as indicated in FIG. 5, but, as hereinafter more fully described, current $i_N$ flows through diode 76 and the LC circuit.

Between times $t_1$ and $t_2$, winding 90 is energized such that neither the base of transistor 70 nor the base of transistor 72 is driven positive from transformer 66. The time period between $t_1$ and $t_2$ is determined by voltage regulator and overcurrent protection circuit 98 as hereinbefore described. At time $t_2$, the winding 90 is unclamped, and negative voltage is applies at the base of transistor 72 since the current $i_{LC}$ is swinging positive at this time, and the leads of winding 80 are crossed between transformer 66 and transistor 72. At the same time, winding 78 will apply a positive-going voltage to transistor 70 causing the same to conduct. The current $i_{LC}$ now flows through transistor 70 until the current $i_{LC}$ crosses the zero axis again at time $t_3$. At this time, the voltage $e_{pri}$ will reverse, and the winding 90 is once more clamped by circuit 98, the duration depending upon the circuit output voltage level desired. Meanwhile, however, the current $i_{LC}$ flows through diode 74, between times $t_3$ and $t_4$. At time $t_4$, the winding 90 is unclamped. At time $t_4$, the base of transistor 72 becomes positive, and the current $i_{LC}$ flows through that transistor from the input DC source as indicated by the current wave $i_N$ in FIG. 5. Current continues to flow through transistor 72 until time $t_5$ when winding 90 is clamped once more. The current $i_{LC}$ crosses the zero axis in a positive direction again, and must now flow through diode 76, the LC circuit now returning current to the source until time $t_6$.

It is noted the time period between $t_1$ and $t_2$ is greater in the case of FIG. 6 wherein a change has taken place in the DC input voltage delivered to the circuit. Consequently, the clamp winding 90 operates for a longer period delaying the phase and lowering the frequency of operation to a point causing voltage $e_{pri}$ to remain the same. The delay in switching results in energy being delivered from the source over a part of the cycle and more energy being returned to the source over a part of the cycle.

It will be noted the current $i_{LC}$ is substantially similar to a sine wave in nature. Power is delivered to the load for a majority of the time, and excessively high currents do not flow in transistors 70 and 72. Rather, these switching transistors conduct substantially longer than in prior art regulated switching circuits of the duty factor type. Thus, the currents are not excessive, and it is not required that a large current flow for a short time as in prior art switching circuits. Switching and regulation is nonetheless accomplished at low current points.

The FIG. 4 circuitry may be considered a feedback oscillator, with an LC circuit, 20—22, primarily determining the frequency of oscillation. At a definite time, as the current wave in the LC circuit crosses the zero axis, the feedback is inhibited or shut off for a selected time period for regulating the output level of the circuit.

It is found desirable in the circuit of FIG. 4 to employ a starting circuit 108 connected across terminals 38 and 40. This starting circuit is employed to deliver a starting pulse to the base of transistor 72 when the converter circuit is initially turned on. A connection from the collector of transistor 72 disables the starting pulse once the circuit is in operation.

Figure 7:
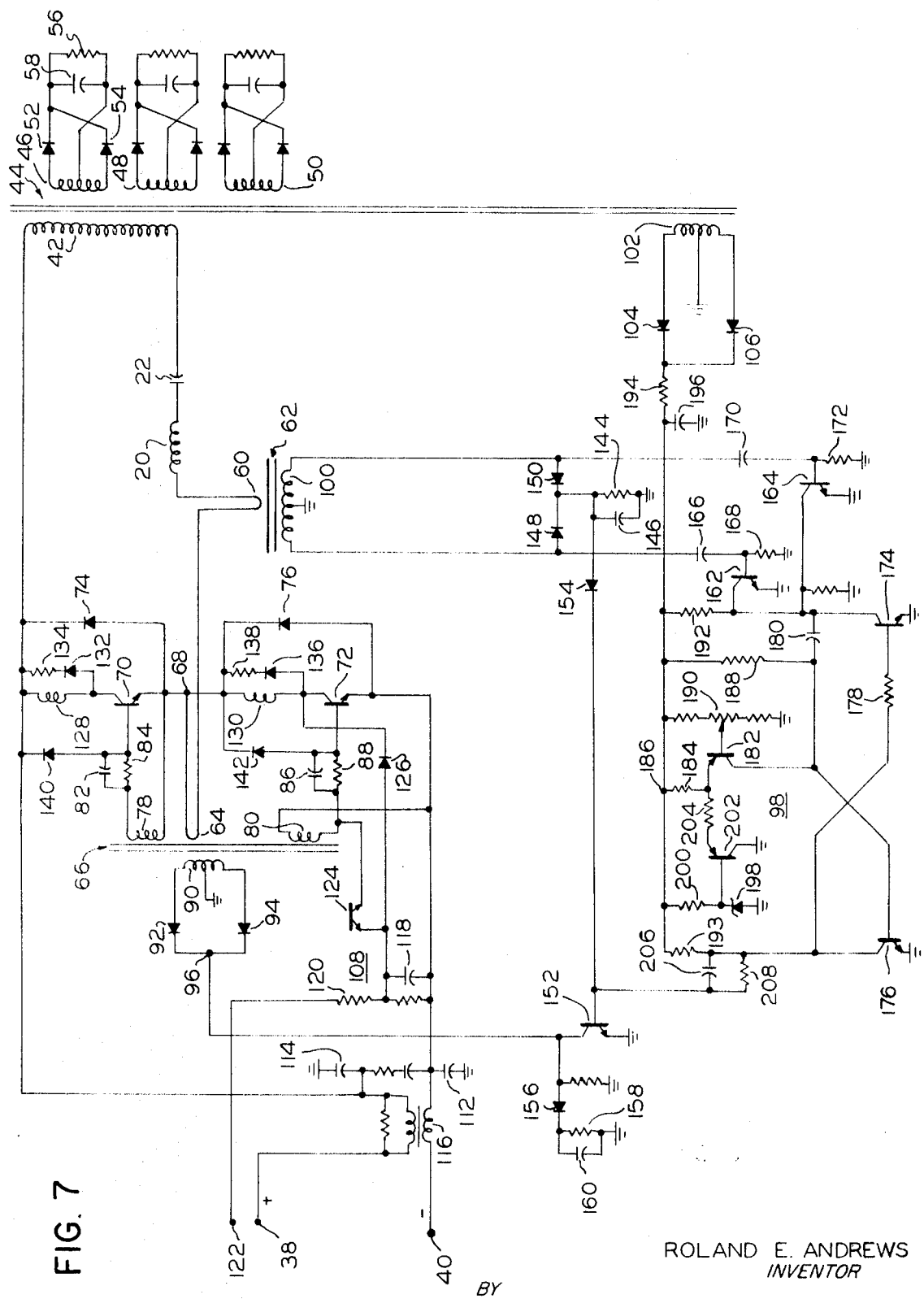
FIG. 7 is a schematic diagram of circuitry in accordance with the present invention.

Referring to FIG. 7, a complete circuit is illustrated wherein similar elements are designated by similar reference numerals. Referring to FIG. 7, a pair of bypass capacitors, 112 and 114, are coupled between the side of the DC line from 38 to 40 to ground for bypassing fast switching transients from the present apparatus so they are not coupled back to the DC source. Also, a coupled choke, 116, is disposed with one winding in series with each of the lines to terminals 38 and 40 for providing a series impedance for inhibiting transients from reaching terminals 38 and 40. The choke coils are coupled so that the device will not have to be large in order to prevent saturation thereof. Thus, DC currents flowing to and from terminals 38 and 40 flow in opposite directions through device 116 resulting in cancellation of the flux which would be generated by the DC currents.

The starting circuit 108 includes a capacitor 118 which is charged through a resistor 120 from terminal 122. Terminal 122 may be connected to terminal 38, for example. However, in the event the present circuit is employed immediately after a rectifier circuit or the like for changing AC to DC, the terminal 122 is suitably connected to the original AC source. As a result, capacitor 118 is charged to either a DC value, or DC value with an AC wave superimposed thereupon. When the voltage in capacitor 118 reaches a predetermined value, three-layer diode 124 conducts and provides a triggering current to the base of transistor 72 for starting oscillations. When the circuit is operating properly, and transistor 72 conducts every half-cycle, capacitor 118 becomes discharged every half-cycle through diode 126.

In order to minimize turn-on losses in the transistors, a choke 128 is provided in series with the collector of transistor 70 and a choke 130 is provided in series with the collector of transistor 72. Each transistor, when it is turned on at its base, has to turn on to a current value theretofore carried by the diode across the other transistor. The chokes minimize the losses that might arise in the short time required for this transition. Diode 132 in series with resistor 134 across choke 128, and diode 136 in series with resistor 138 across choke 130 act to absorb the energy stored in the choke during transistor turn on. Diode 140 connected from the base of transistor 70 to the remote end of choke 128, and diode 142 connected from the base of transistor 72 to the remote end of the choke 130 takes some of the base current from the transistors to aid in turning the transistors off.

Now considering the voltage regulator and overcurrent protection circuit 98, as illustrated in FIG. 7, the ends of the winding 100 are connected to resistor 144 in parallel with capacitor 146 through diodes 148 and 150. When the current through winding 60 reaches an excessive value, transistor 152 is turned on through diode 154, thereby clamping winding 90 to ground. This accomplishes the current limiting aspect of circuit 98. The diode 156 and the parallel combination of resistor 158 and capacitor 160 connected in series between the collector of transistor 152 and ground provide transient voltage protection.

The ends of winding 100 are also coupled respectively to the bases of transistors 162 and 164. A first end of winding 100 is coupled through capacitor 166 to the base of transistor 162, while the base is returned to ground employing resistor 168. Capacitor 170 couples the opposite end of winding 100 to the base of transistor 164, with the base being returned to ground via resistor 172. The collectors of transistors 162 and 164 are connected to the collector of transistor 174, the latter forming a monostable multivibrator with transistors 176.

The emitters of transistors 174 and 176 are grounded while the collectors are cross-coupled to the bases of the opposite transistor as illustrated. Thus, the collector of transistor 176 is coupled to the base of transistor 174 via resistor 178, and a capacitor 180 is interposed between the collector of transistor 174 and the base of transistor 176. Capacitor 180 forms part of a timing circuit together with the impedance of transistor 182 which is interposed between the base of transistor 176 and a resistor 184 connecting the emitter of transistor 182 to circuit point 186. Resistor 188 is disposed substantially in parallel with transistor 182, while the base of transistor 182 is connected to a potentiometer 190 forming part of a voltage divider between point 186 and ground. The collector of transistor 176 is also coupled to point 186 via resistor 206, and a resistor 192 couples the collector of transistor 174 to point 186.

The voltage at point 186 is supplied from winding 102 by way of diodes 104 and 106 which provide rectified current through resistor 194. A filter capacitor 196 smooths the voltage at point 186. Thus a DC level is provided at point 186 proportional to the output level of the converter circuit according to the present invention, with the output level being sensed with winding 102.

A reference voltage is established across Zener diode 198 connected to point 186 through resistor 200. The base of transistor 202 is connected to the midpoint between the Zener diode and resistor 200, while its emitter is coupled to the emitter of transistor 182 via resistor 204. When the voltage at the adjustable tap on potentiometer 190 becomes too low, indicating too low an output voltage level, the current in potentiometer 190 drops, and the base of transistor 182 drops in potential relative to the emitter thereof. The emitter voltage of transistor 182 drops also, whereas the emitter voltage of transistor 202 remains nearly constant by means of the regulating of Zener diode 198. Therefore transistor 182 turns on to a higher current value.

The monostable multivibrator comprising transistors 174 and 176 normally resides in a state wherein transistor 174 is nonconducting and transistor 176 is conducting. At each transition through zero of current wave through elements 20 and 22, either transistor 162 or transistor 164 will turn on briefly with a consequent negative excursion in collector voltage at one of these transistors. The negative excursion is coupled through capacitor 180 to the base of transistor 176, turning off transistor 176. The collector voltage of transistor 176 rises, and transistor 174 is turned on via resistor 178. This condition, defining the unstable state of the multivibrator, will continue until the terminal of capacitor 180 connected to the base of transistor 176 charges up through transistor 182 to a value such that transistor 176 is turned back on at its base.

The unstable period of the multivibrator defines the time period during which the clamp is applied to the oscillator circuit via winding 90. Capacitor 206 in parallel with resistor 208 couples the collector of transistor 176 to terminal 96 in the oscillator circuit via transistor 152. The unstable period of operation of the monostable multivibrator is quite short compared to the period of a half-cycle of the $i_{LC}$ current and defines the periods $t_1-t_2$, $t_3-t_4$, $t_5-t_6$, etc. as indicated in FIGS. 5 and 6. As the voltage at point 186 becomes lower, the width of the pulse generated by the monostable multivibrator decreases thus clamping the circuit for a shorter period of time and allowing the output voltage to increase. Similarly, when the output voltage gets too high, the period of the monostable multivibrator increases, lengthening the clamping period, and lowering the voltage to the appropriate value. Potentiometer 190 may be employed to select the desired output voltage level for the converter circuit.

It can be seen that the switching and voltage half-cycle, takes place at or near the zero current value in the alternating $i_{LC}$ wave in the LC circuit. Thus, switching and voltage regulation are accomplished without the necessity of switching large currents for control purposes, thereby reducing requirements that the circuit components need to meet, while turnoff switching losses for transistors 70 and 72 are reduced. After the transistors are turned off, at the end of each half-cycle, they remain off for a period of time used to accomplish the regulation. Before one of them turns on again, the other has time to completely recover from current storage conditions therein.

While I have shown and described preferred embodiments of my invention, it will be apparent to those skilled in the art that many changes and modifications may be made without departing from my invention in its broader aspects.

I claim:

1. A converter circuit comprising:
   a tuned resonant circuit,
   switching means for periodically energizing said tuned circuit from a direct current source for producing an alternating current in said tuned circuit,
   means coupled to said tuned circuit for receiving an output in response to alternating current produced in said tuned circuit,
   feedback means for causing said switching means to switch substantially at a rate synchronized with a resonant frequency of said tuned circuit,
   and means for altering said switching rate in response to the output level of said means for receiving an output, wherein said means for altering the switching rate is responsive near substantially zero current condition in the tuned resonant circuit and said switching means for disabling said feedback means for a selected period of time during each cycle operation dependent on the output level of said circuit.

2. The circuit according to claim 1 wherein said means for receiving an output comprises rectifier means coupled to said tuned circuit for producing direct current output, said rectifier means producing the output level to which said means for altering the switching rate is responsive.

3. A converter circuit comprising:
   direct current input terminals,
   a tuned resonant circuit comprising an inductance and a capacitance in series therewith,
   an output transformer having a primary winding thereon, one end of which is coupled to said series resonant circuit and the other end of which is coupled to a first direct current input terminal,
   a first switching means for coupling the remaining direct current input terminal to said resonant circuit,
   a second switching means for coupling the first direct current input terminal to said resonant circuit, synchronizing means for detecting the waveform in said resonant circuit for alternately operating said switching means, said synchronizing means switching said switching means under nearly zero current flow conditions between said switching means and said resonant circuit, and control means for detecting the output level in said output transformer for rendering said synchronizing means ineffective for a predetermined period of time during each cycle of operation thereof dependent on the output level of said transformer.

4. The circuit according to claim 3 wherein said switching means comprise transistors.

5. The circuit according to claim 3 wherein said output transformer has at least one secondary winding and a direct current load, and further including rectifier means between said winding and said load.

6. The circuit according to claim 3 wherein said control means is provided with coupling means for sensing the waveform in said resonant circuit, means for providing a level responsive to predetermined values of output from said transformer, and means for disabling said synchronization for predetermined periods of time at times detected by said coupling means and in response to said level.

7. The circuit according to claim 3 wherein said switching means comprise transistors alternately coupling said resonant circuit with said output transformer, said synchronization means including a transformer having a primary thereon connected in series with said resonant circuit, and secondary windings on said last mentioned transformer coupled with control electrodes of transistors for causing said transistors to conduct alternately in accordance with the polarity of the waveform in said resonant circuit.

8. The circuit according to claim 7 wherein said control means includes an additional transformer having a primary winding coupled in series with said resonant circuit, said control means further including a monostable multivibrator for producing a pulse in response to the approximate zero crossing of the AC wave in said resonant circuit, and an additional winding on said synchronizing means transformer for receiving the output of said monostable multivibrator and inhibiting the operation of said transistors for the period of operation of said monostable multivibrator, said monostable multivibrator having a timing circuit responsive to the output voltage level of said converter circuit so that said transistors are turned off for a period of time each cycle dependent upon the output level of said converter circuit.

9. The circuit according to claim 8 further including diodes shunted across each of said transistors in a reverse polarity direction from the principal current carrying paths of said transistors.

10. A circuit for producing an alternating current in response to a direct current supply, comprising:

an active controlled device and resonant frequency determining means in circuit with said active controlled device, means providing positive feedback from an output of said active controlled device to an input thereof, causing said active controlled device to tend to oscillate and produce an alternating output at substantially the resonant frequency of said resonant frequency determining means, and means responsive to the level of output of said circuit for determining the time during each cycle when said feedback is applied by effectively decoupling said feedback for a selected time period during each cycle of said alternating output, depending upon said output level.

11. The circuit according to claim 10 wherein said responsive means includes switching means for switching said feedback during each cycle.

12. The circuit according to claim 10 wherein said active controlled device comprises switching means, and wherein said responsive means switches said switching means into an operative condition for only a selected time period during each cycle of alternating output dependent upon the output level.

13. The circuit according to claim 12 wherein said switching means is operated under substantially low current conditions.

14. A converter circuit comprising:

a tuned resonant circuit, switching means for periodically energizing said tuned circuit from a direct current source for producing an alternating current in said tuned circuit, means coupled to said tuned circuit for receiving an output in response to alternating current produced in said tuned circuit, wherein said switching means comprises first and second transistors alternately coupling said tuned circuit to the means for receiving an output, a first of said transistors being serially interposed between said tuned circuit and one terminal of the direct current source with the second of said transistors being coupled between said tuned circuit and the other terminal of the same direct current source, feedback means for causing said switching means to switch substantially at a rate synchronized with a resonant frequency of said tuned circuit, and means for altering said switching rate in response to the output level of said means for receiving an output.

PO-1050
(5/69)

UNITED STATES PATENT OFFICE
CERTIFICATE OF CORRECTION

Patent No. 3,596,165          Dated July 27, 1971

Inventor(s) Roland E. Andrews

It is certified that error appears in the above-identified patent and that said Letters Patent are hereby corrected as shown below:

Col. 1, line 17, "DC level value" should be --DC value--

Col. 1, line 24, "cam" should be --can--

Col. 1, line 38, second "as" should be deleted.

Col. 1, line 44, "generator" should be --generation--

Col. 2, line 10, "of time" should be --of the time--

Col. 3, line 26, "discussions" should be --discussion--

Col. 3, line 50, "waveforms" should be --waveform--

Col. 4, line 9, "20" should be --22--

Col. 4, line 50, "wall" should be --way--

Col. 4, line 52, "x" (end of line) should be --ex--

Col. 5, line 58, "applies" should be --applied--

Col. 6, line 39, "38 to 40" should be --38 and 40--

Col. 7, line 25, "transistors" should be --transistor--

Col. 8, line 20, "half-cycle" should be --regulation--

Col. 8, line 53, "condition" should be --conditions--

Col. 8, line 56, "cycle operation" should be --cycle of operation--.

Signed and sealed this 18th day of April 1972.

(SEAL)
Attest:

EDWARD M. FLETCHER, JR.
Attesting Officer

ROBERT GOTTSCHALK
Commissioner of Patents